(12) United States Patent
Lo et al.

(10) Patent No.: US 8,381,883 B2
(45) Date of Patent: Feb. 26, 2013

(54) WHEELCHAIR SAFETY DEVICE

(76) Inventors: Wang Kin Lo, Tsuen Wan (HK); Wai Man Wong, Tsuen Wan (HK)

( * ) Notice: Subject to any disclaimer, the term of this patent is extended or adjusted under 35 U.S.C. 154(b) by 237 days.

(21) Appl. No.: 13/042,654

(22) Filed: Mar. 8, 2011

(65) Prior Publication Data
US 2011/0226567 A1    Sep. 22, 2011

(30) Foreign Application Priority Data

Mar. 17, 2010   (CN) .................. 2010 2 0136764 U
Jan. 6, 2011   (WO) ................ PCT/CN2011/070063

(51) Int. Cl.
*B60T 1/00*   (2006.01)
*B62M 1/14*   (2006.01)

(52) U.S. Cl. .................. 188/2 F; 280/250.1; 280/304.1

(58) Field of Classification Search ............... 188/2 F, 188/74; 280/250.1, 272, 304.1
See application file for complete search history.

(56) References Cited

U.S. PATENT DOCUMENTS

| | | | |
|---|---|---|---|
| 5,174,418 A * | 12/1992 | Le et al. ................. | 188/2 F |
| 6,431,572 B1 * | 8/2002 | Harden et al. ........... | 280/250.1 |
| 6,520,526 B2 * | 2/2003 | Amirola .................. | 280/304.1 |
| 6,655,503 B1 | 12/2003 | Moody | |
| 2002/0153207 A1 * | 10/2002 | Otaola Amirola ........ | 188/2 F |

FOREIGN PATENT DOCUMENTS

| | | |
|---|---|---|
| CN | 2817799 Y | 9/2006 |
| CN | 2905011 Y | 5/2007 |
| CN | 201631523 U | 11/2010 |
| JP | 11028231 A | 2/1999 |

\* cited by examiner

*Primary Examiner* — Christopher Schwartz
(74) *Attorney, Agent, or Firm* — Rabin & Berdo, P.C.

(57) ABSTRACT

A wheelchair safety device comprises a brake lever, four link levers, an upper brake plate, a brake wheel, a lower brake plate, a parking wheel, and an angularly adjustable mounting plate. One end of the first, the second and the third link levers is respectively articulated at the brake lever, another end of the first and the second link levers are articulated with one end of the fourth link lever. Another end of the fourth link lever is articulated at the upper brake plate and another end of the third link lever is articulated at the lower brake plate. One end of the upper and the lower brake plates is respectively articulated at the angularly adjustable mounting plate, and another end thereof is mounted with the brake wheel and the parking wheel, respectively. The brake wheel and the parking wheel respectively act on the wheelchair.

9 Claims, 8 Drawing Sheets

WHEELCHAIR SAFETY DEVICE

CROSS-REFERENCE TO RELATED APPLICATION(S)

This application claims the benefit of Chinese Patent Application No. 201020136764.0, entitled "Wheelchair Safety Device" filed on Mar. 17, 2010, and of PCT Application No. PCT/CN2011/070063, entitled "Wheelchair Safety Device" filed on 6 Jan. 2011.

TECHNICAL FIELD

The present invention relates to a wheelchair for disabled persons, and more particularly to a safety device for wheelchairs adapted for ramp travel.

BACKGROUND OF THE INVENTION

Global warming leads to more and more natural disasters, a major earthquake in Sichuan had injured more than three hundred thousand people, many victims had become disabled persons thereafter. Coupled with the aging population, there is increasing number of wheelchair users. Wheelchair is very difficult to maneuver, especially to those beginners and elderly persons living in hilly regions. When a wheelchair is driven and propelled by a user or someone else for going up or down a hill or ramp, if the wheelchair driver is exhausted in midway, the wheelchair will rapidly slide forwardly or backwardly in a few seconds and cause a danger. To solve the problem on ramp travel, it is important that the wheelchair speed could be reduced while going down the ramp, and the driver could take a rest on occasion while going up the ramp, and no physical strength is needed to keep the wheelchair from rolling backwards.

As there is increasing number of wheelchair users in recent years, there are many new products launched in the market, such as anti-rollback wheels, bicycle-style hand brakes, oxygen bottle racks, and the like. An anti-rollback wheel merely serves as a safety wheel to prevent the user from falling out of the wheelchair when the wheelchair is inclined backwardly. A bicycle-style hand brake may be used for reducing the speed of the wheelchair while going down the ramp, but the wheelchair might be out of control if the user had gripped the hand brake for too long and became exhausted.

SUMMARY OF THE INVENTION

It is an object of the present invention to provide a wheelchair safety device, characterized in that an one-way bearing is embedded into a parking wheel such that wheelchair tires can move forwardly and cannot move backwardly, whereby preventing the wheelchair from rolling back or sliding forward. If a device according to the invention, a double toggle lever device, is installed in the region of tires, in the case of it is pressed during going up a ramp, the wheelchair will not roll back even if the user feels tire and let go, and also will not pitch down while going down the ramp. In this way, the drawbacks of the prior arts can be overcome in a preferable manner.

According to one aspect of the present invention, the technical solution of the present invention provided for the above object being a wheelchair safety device comprising: a brake lever, a first link lever, a second link lever, a third link lever, a fourth link lever, an upper brake plate, a brake wheel, a lower brake plate, a parking wheel, and an angularly adjustable mounting plate; wherein one end of the first link lever, the second link lever, and the third link lever are respectively articulated at the brake lever, and another end of the first link lever and the second link lever are articulated with one end of the fourth link lever, while another end of the fourth link lever is articulated at the upper brake plate and another end of the third link lever is articulated at the lower brake plate; one end of the upper brake plate is articulated at the angularly adjustable mounting plate, and another end of the upper brake plate is provided with an axle on which the brake wheel is mounted, while one end of the lower brake plate is articulated at the angularly adjustable mounting plate, and another end of the lower brake plate is provided with an axle on which the parking wheel is mounted via an one-way bearing; wherein the fourth link lever drives the upper brake plate so as to make it pivot on an articulation point of the upper brake plate and the angularly adjustable mounting plate, while the third link lever drives the lower brake plate to make it pivot on an articulation point of the lower brake plate and the angularly adjustable mounting plate; wherein the brake wheel and the parking wheel respectively act on wheelchair tires.

Further, the technical solution may characterize in that: a line joining an articulation point of the upper brake plate and the fourth link lever, the articulation point of the upper brake plate and the angularly adjustable mounting plate, and an articulation point of the upper brake plate and the brake wheel forms a triangle; while a line joining an articulation point of the lower brake plate and the third link lever, the articulation point of the lower brake plate and the angularly adjustable mounting plate, and an articulation point of the lower brake plate and the parking wheel also forms a triangle.

Preferably, longitudinal grooves or mesh-like grooves may be evenly distributed on surfaces of the brake wheel and the parking wheel.

The angularly adjustable mounting plate may be a porous mounting plate on which holes are evenly distributed; or the angularly adjustable mounting plate may be a mounting plate of the type on which curved through slots are arranged.

Preferably, the one-way bearing may comprise a ratchet; the brake wheel can be in the form of an eccentric wheel; and a handle is secured to an end of the brake lever.

The advantageous effects of the present invention lie in that: the device of the present invention is safe and reliable, simple in configuration, low in cost, easy to install and maneuver, and so on.

Figure 1:
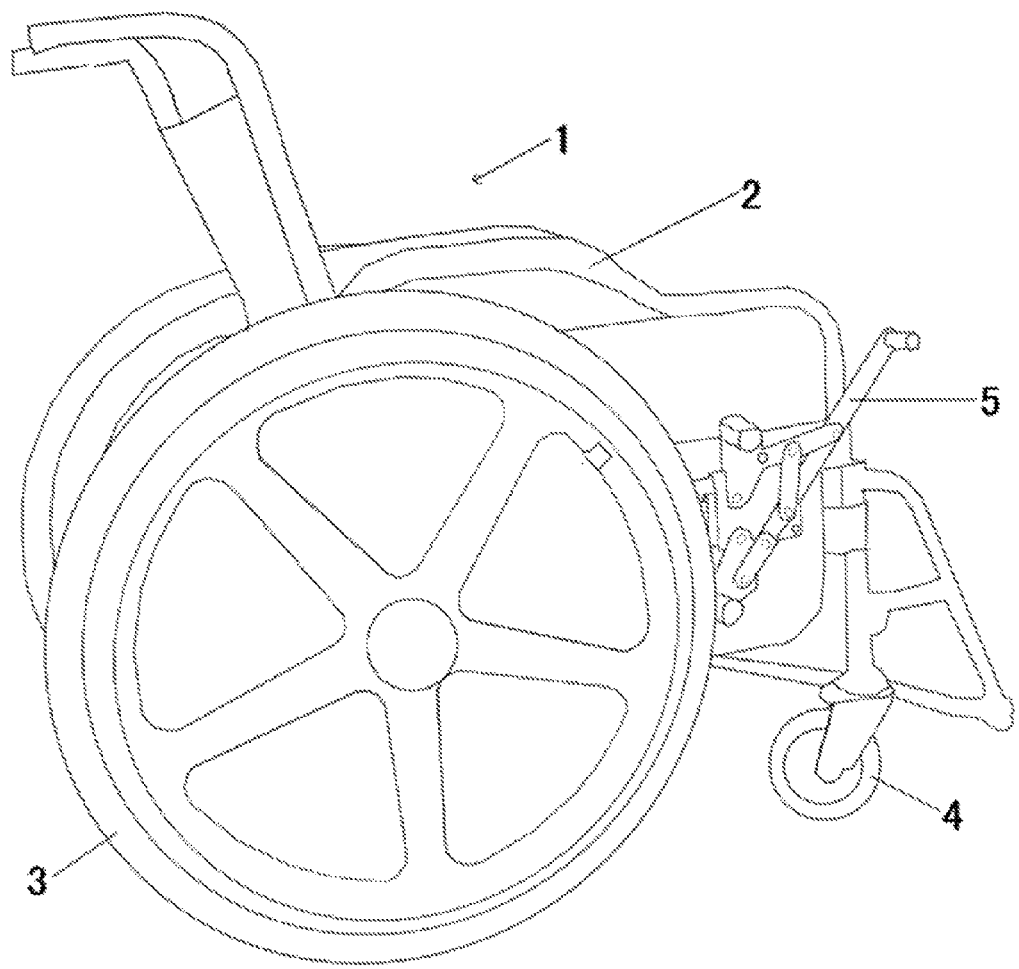
FIG. 1 is a schematic view showing a wheelchair with a safety device of the present invention in use.
Figure 2:
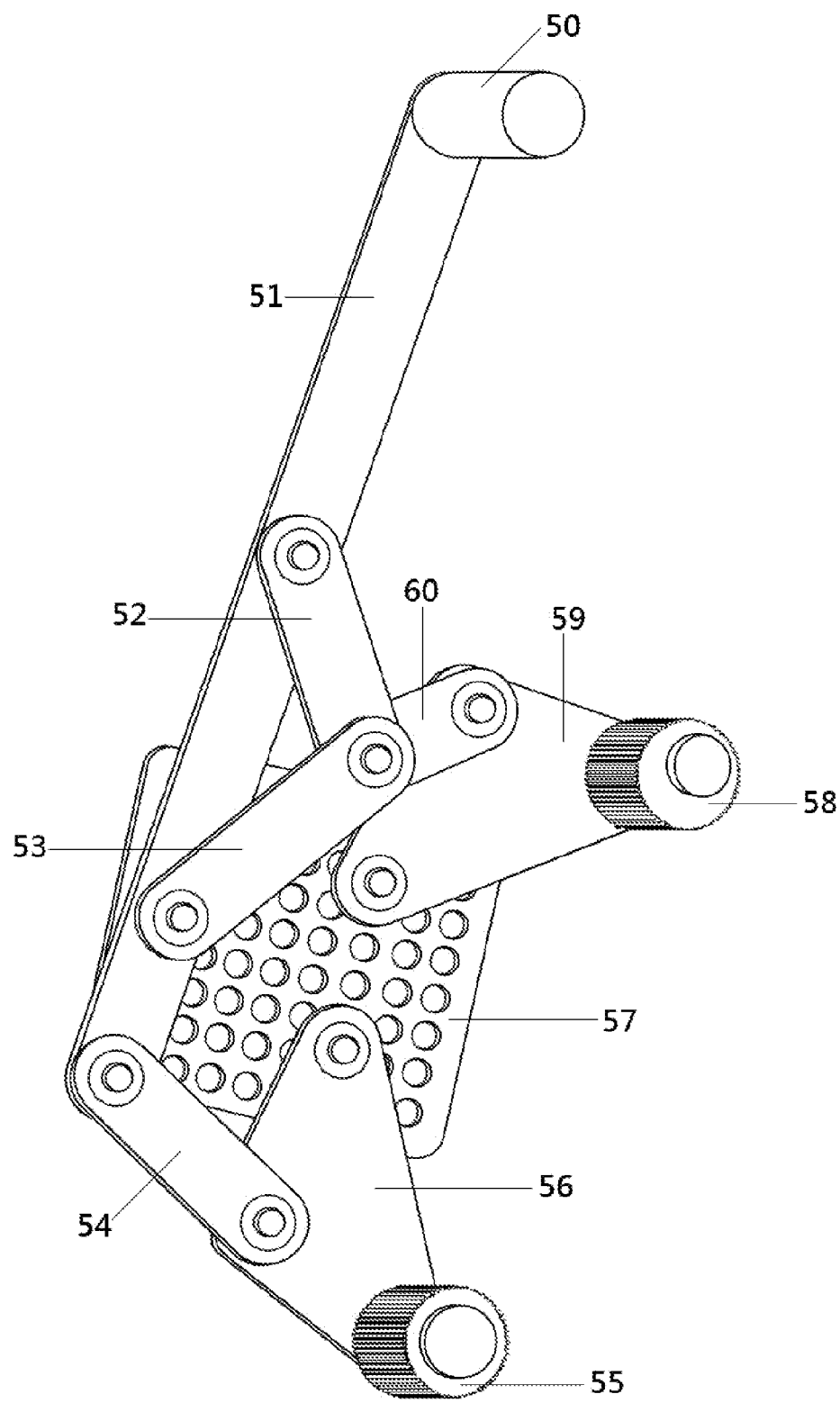
FIG. 2 is a schematic view showing overall structure of the wheelchair safety device of the present invention.
Figure 3:
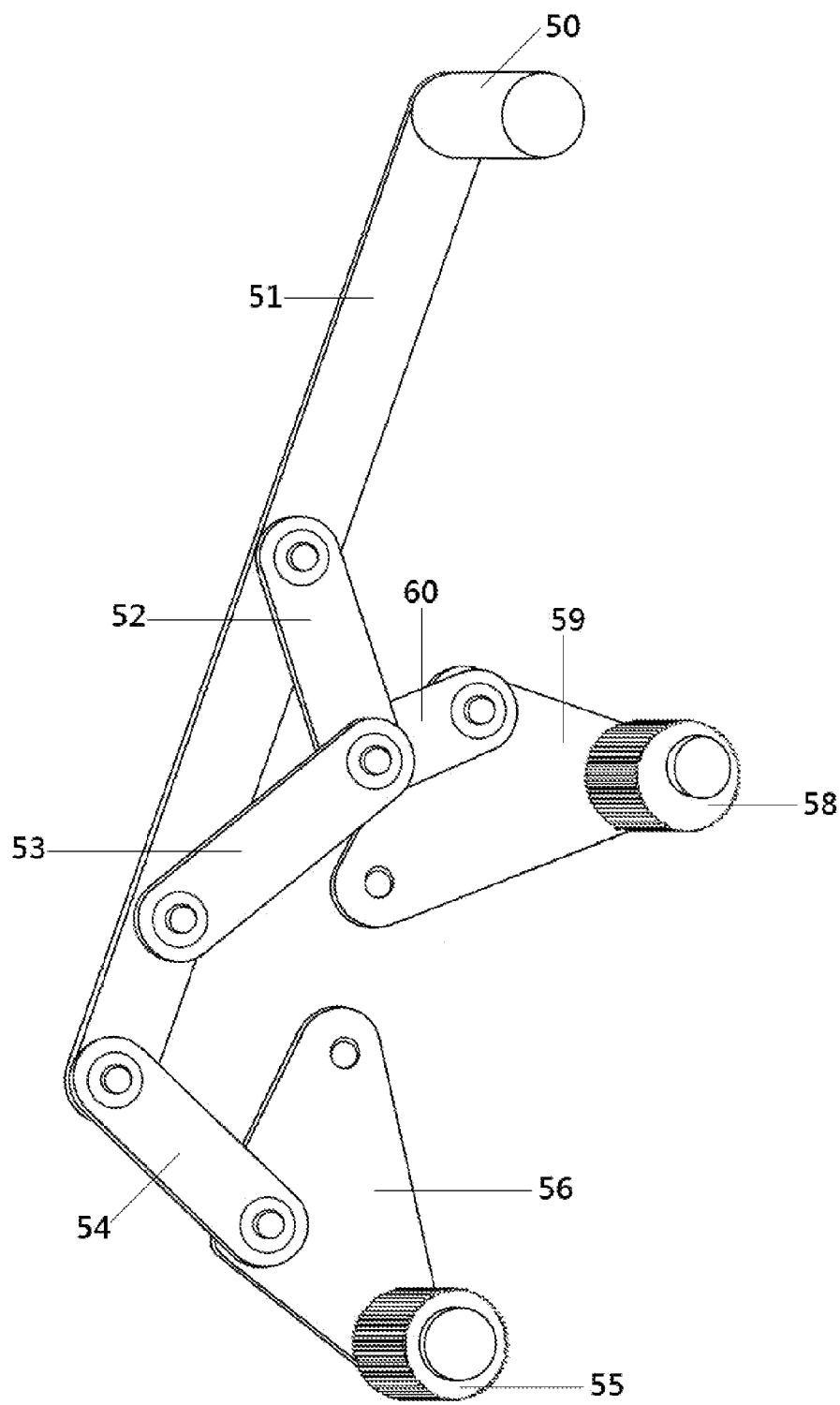
FIG. 3 is a schematic view of braking structures in FIG. 2.
Figure 4:
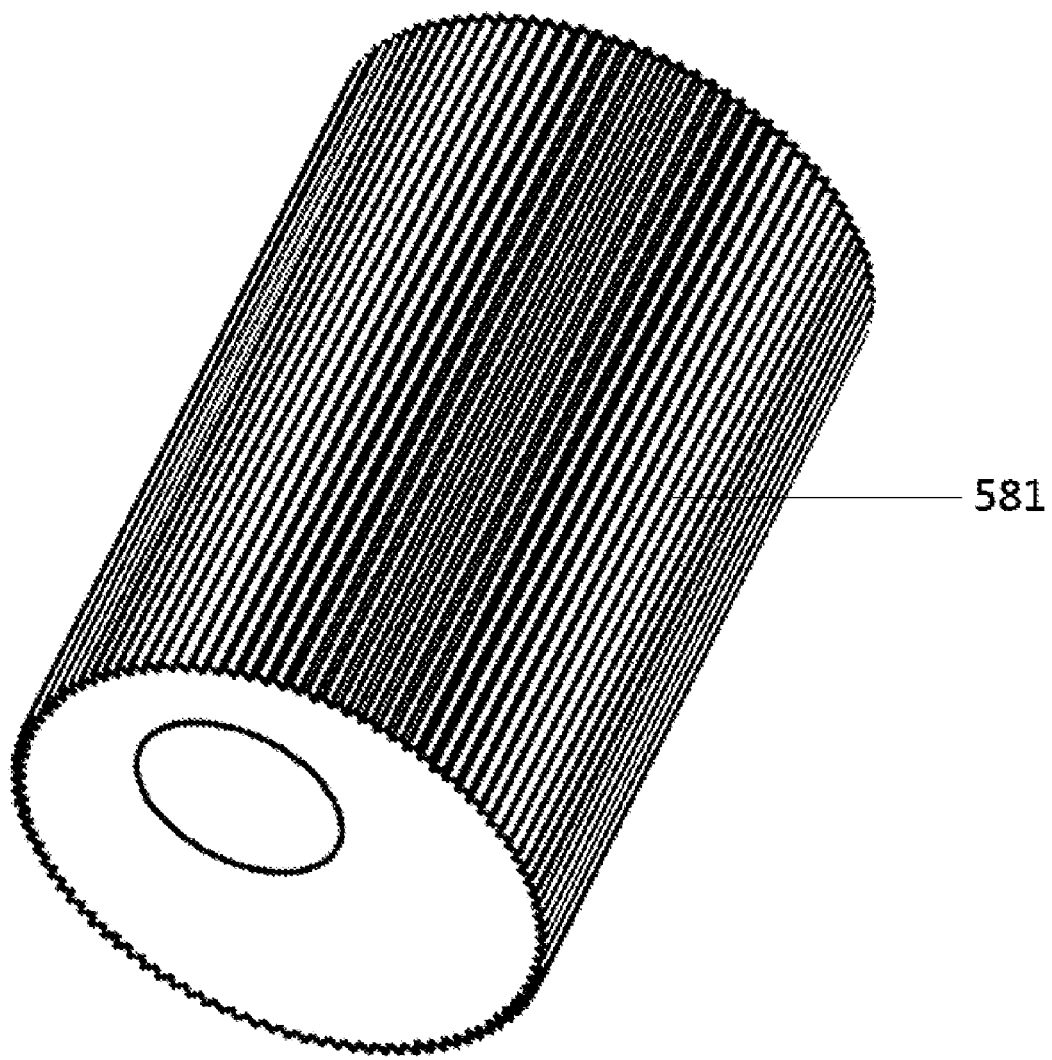
FIG. 4 is a schematic view of an brake wheel in FIG. 2.
Figure 5:
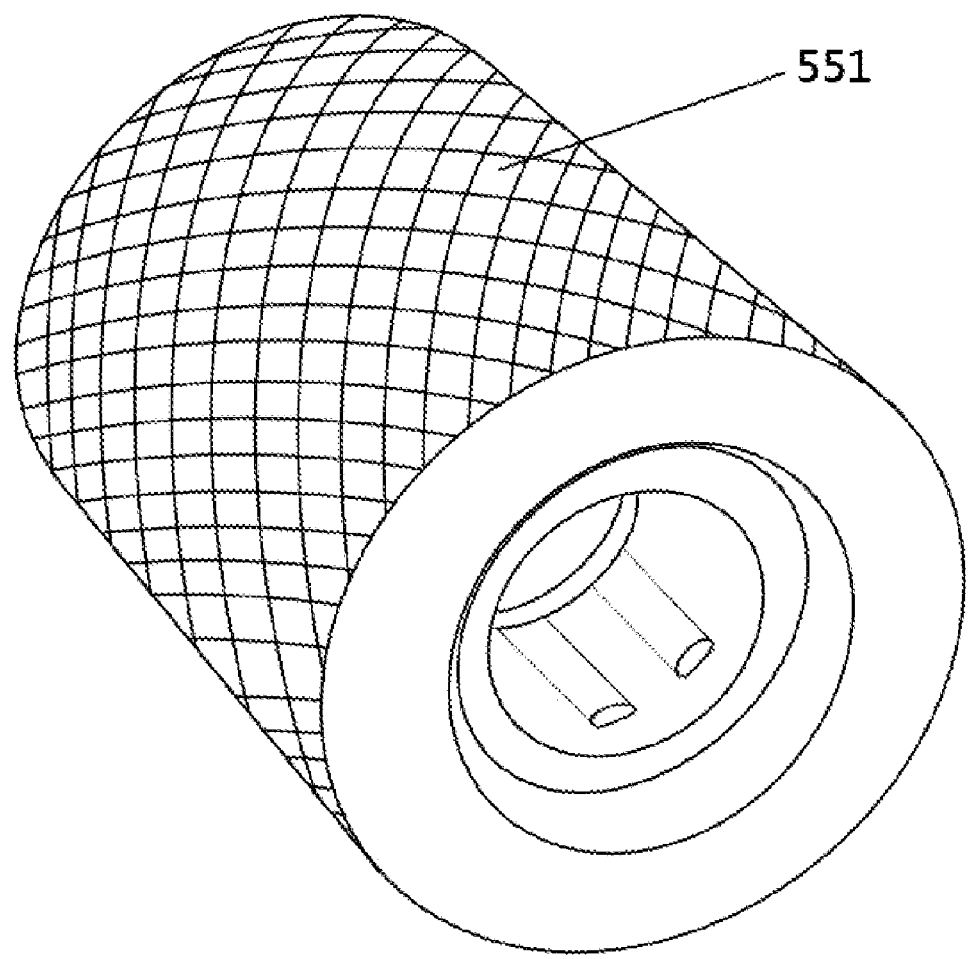
FIG. 5 is a schematic view of a parking wheel in FIG. 2.
Figure 6:
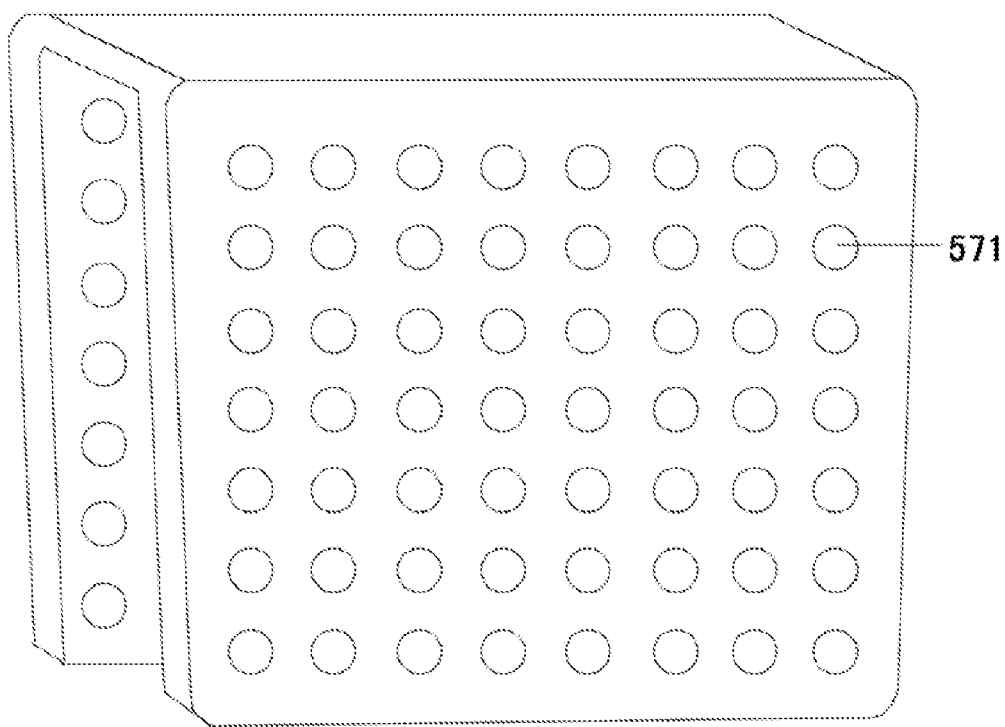
FIG. 6 is a schematic view of an angularly adjustable mounting plate in FIG. 2 on which holes are arranged.

The reference signs of the components shown in the drawings are listed below:

1 wheelchair,
2 seat,
3 road wheel,
4 guide wheel, 5 safety device,
50 handle,
51 brake lever,
52 first link lever,
53 second link lever,
54 third link lever,
55 parking wheel,
551 mesh grooves,
56 lower brake plate,
57 angularly adjustable mounting plate,
571 hole,
58 brake wheel,
581 longitudinal grooves,
59 upper brake plate,
60 fourth link lever,
61 angularly adjustable mounting plate with curved through slots,
611 angularly adjustable curved holes.

DETAILED DESCRIPTION OF THE PREFERRED EMBODIMENTS

The present invention will be further illustrated with respect to the accompanied drawings.

As can be seen from the FIGS. 1 to 6 showing a wheelchair safety device and its main components of the present invention, the safety device 5 belongs to a braking component of a wheelchair 1, which effects braking action to tires of a road wheel 3 of the wheelchair 1 by installing an angularly adjustable mounting plate 57 (which is a porous mounting plate in this embodiment) at lateral sides of a seat 2 of the wheelchair 1, while a parking wheel mainly plays a parking role. The safety device 5 mainly comprises a handle 50, a brake lever 51, a first link lever 52, a second link lever 53, a third link lever 54, a parking wheel 55, a lower brake plate 56, the angularly adjustable mounting plate 57, a brake wheel 58 (an eccentric wheel), a upper brake plates 59, and a fourth link lever 60; wherein one end of the first link lever 52, the second link lever 53, and the third link lever 54 are respectively articulated at the brake lever 51, and another end of the first link lever 52 and the second link lever 53 are articulated with one end of the fourth link lever 60, while another end of the fourth link lever 60 is articulated at the upper brake plate 59 and another end of the third link lever 54 is articulated at the lower brake plate 56; one end of the upper brake plate 59 is articulated at the angularly adjustable mounting plate 57, and another end of the upper brake plate 59 is provided with an axle (not shown) on which the brake wheel 58 is mounted, while one end of the lower brake plate 56 is articulated at the angularly adjustable mounting plate 57, and another end of the lower brake plate 56 is provided with an axle (not shown) on which the parking wheel 55 is mounted via an one-way bearing (similar to a ratchet wheel of a bicycle); wherein the fourth link lever 60 drives the upper brake plate 59 so as to make it pivot on an articulation point of the upper brake plate and the angularly adjustable mounting plate, while the third link lever drives the lower brake plate to make it pivot on an articulation point of the lower brake plate 56 and the angularly adjustable mounting plate 57; wherein the brake wheel 58 and the parking wheel 55 respectively act on tires of the road wheel 3 of the wheelchair 1.

Figure 7:
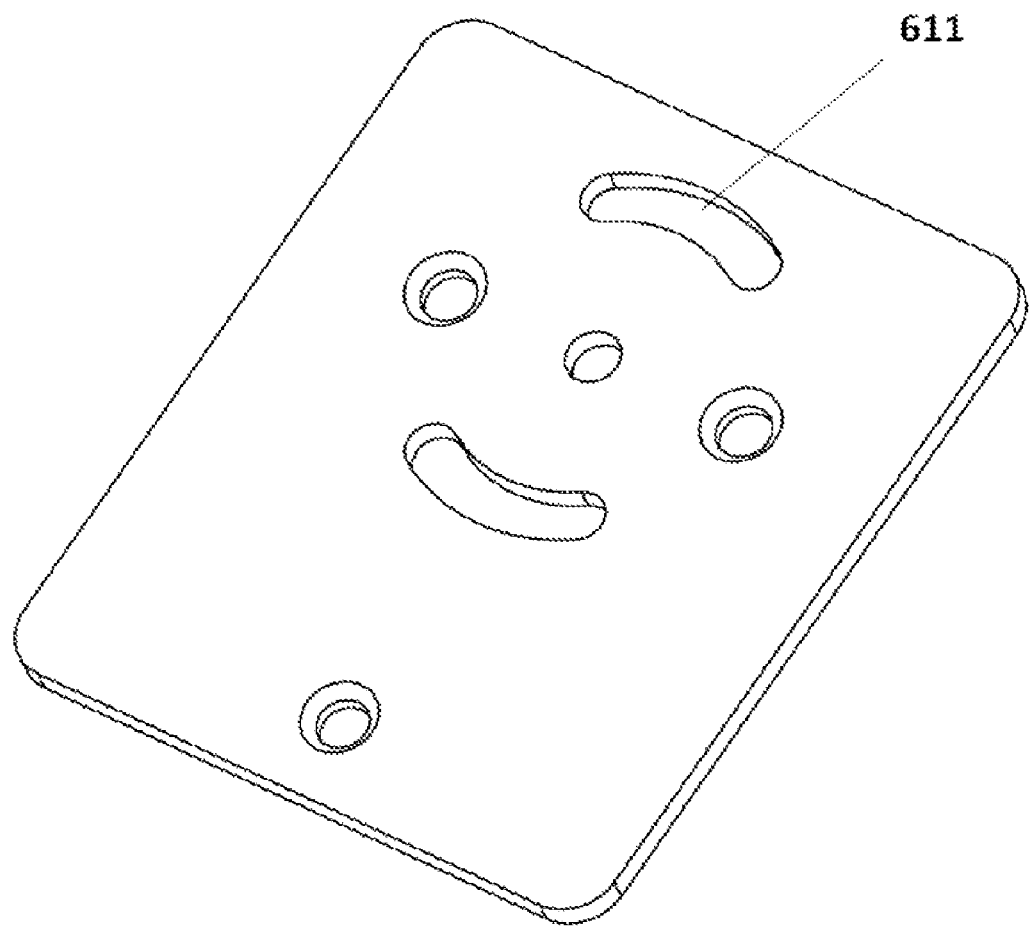
FIG. 7 is a schematic view of an variant in place of the angularly adjustable mounting plate in FIG. 2.
Figure 8:
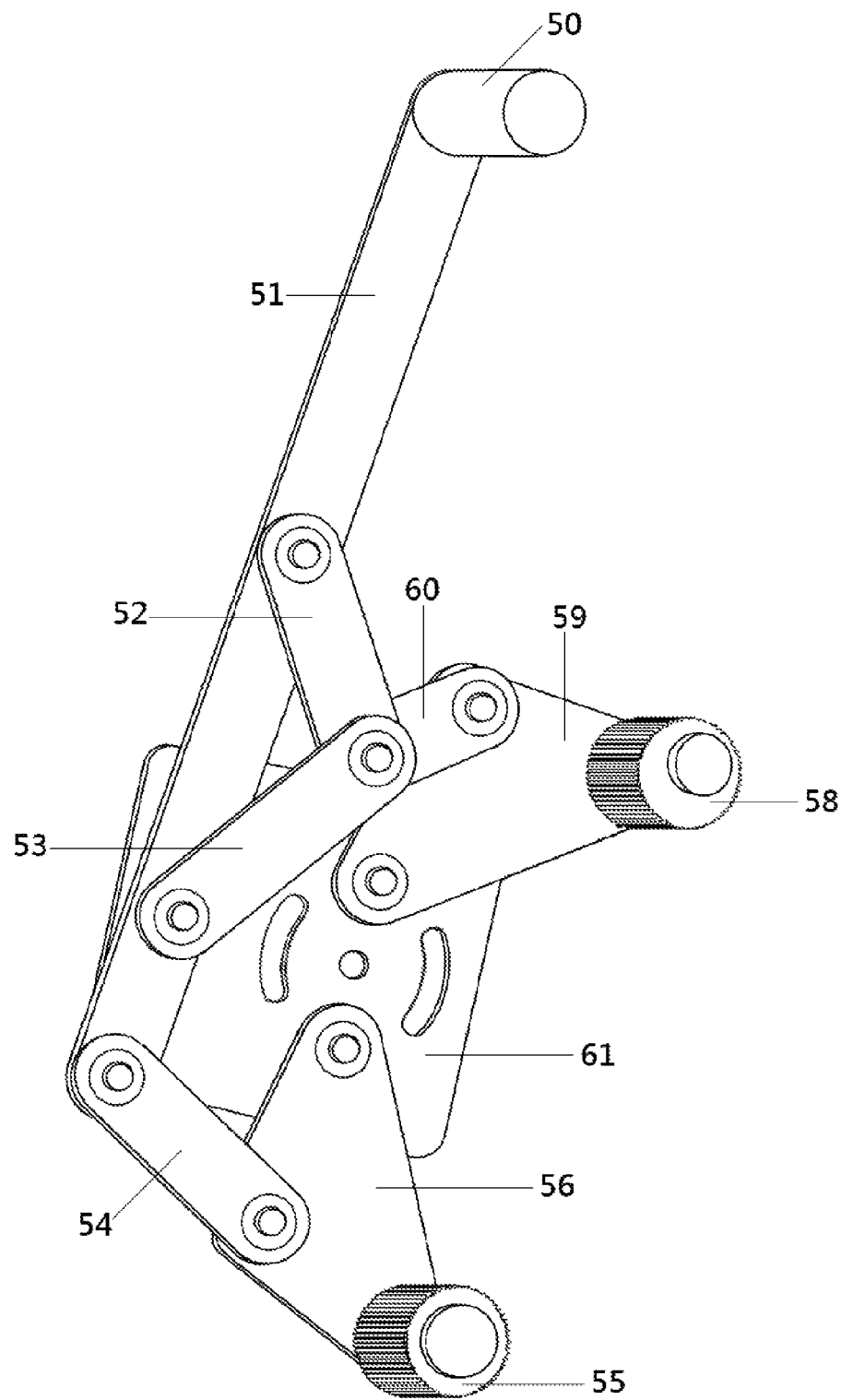
FIG. 8 is a schematic view of the safety device of the present invention in which the angularly adjustable mounting plate in FIG. 7 is installed.

According to another embodiment of the present invention, the angularly adjustable mounting plate may be a mounting plate 61 of the type on which curved through slots 611 are arranged for angular adjustment, as can be seen from FIG. 7.

Working Principle

The wheelchair safety device of the present invention can prevent the wheelchair from rolling back while going up a ramp or slope, and reduce speed while going down a ramp. When going up a ramp, a wheelchair user merely needs to press down the parking wheel having a one-way bearing of the double toggle lever device so as to achieve the anti-rollback effect by friction between the parking wheel and wheelchair tires; and the friction between the parking wheel and wheelchair tires can also slow down the speed of the wheelchair while going down a ramp. During the ramp travel, the wheelchair could be stopped by pressing down the double toggle lever device in reversed direction so as to press against the tires with the eccentric brake wheel of which the off-center feature could prevent the displacement thereof. According to the present invention, the parking wheel and the brake wheel are interchangeable.

What is claimed is:

1. A wheelchair safety device comprising: a brake lever, a first link lever, a second link lever, a third link lever, a fourth link lever, an upper brake plate, a brake wheel, a lower brake plate, a parking wheel, and an angularly adjustable mounting plate; wherein one end of the first link lever, the second link lever, and the third link lever are respectively articulated at the brake lever, and another end of the first link lever and the second link lever are articulated with one end of the fourth link lever, while another end of the fourth link lever is articulated at the upper brake plate and another end of the third link lever is articulated at the lower brake plate; one end of the upper brake plate is articulated at the angularly adjustable mounting plate, and another end of the upper brake plate is provided with an axle on which the brake wheel is mounted, while one end of the lower brake plate is articulated at the angularly adjustable mounting plate, and another end of the lower brake plate is provided with an axle on which the parking wheel is mounted via an one-way bearing; wherein the fourth link lever drives the upper brake plate so as to make it pivot on an articulation point of the upper brake plate and the angularly adjustable mounting plate, while the third link lever drives the lower brake plate to make it pivot on an articulation point of the lower brake plate and the angularly adjustable mounting plate; wherein the brake wheel and the parking wheel respectively act on wheelchair tires.

2. The wheelchair safety device of claim 1, wherein a line joining an articulation point of the upper brake plate and the fourth link lever, the articulation point of the upper brake plate and the angularly adjustable mounting plate, and an articulation point of the upper brake plate and the brake wheel forms a triangle; while a line joining an articulation point of the lower brake plate and the third link lever, the articulation point of the lower brake plate and the angularly adjustable mounting plate, and an articulation point of the lower brake plate and the parking wheel also forms a triangle.

3. The wheelchair safety device of claim 1, wherein longitudinal grooves or mesh-like grooves are evenly distributed on surfaces of the brake wheel and the parking wheel.

4. The wheelchair safety device of claim 1, wherein the angularly adjustable mounting plate is a porous mounting plate on which holes are evenly distributed.

5. The wheelchair safety device of claim 1, wherein the angularly adjustable mounting plate is a mounting plate of the type on which curved through slots are arranged.

6. The wheelchair safety device of claim 1, wherein the one-way bearing comprises a ratchet.

7. The wheelchair safety device of claim 1, wherein the brake wheel is an eccentric wheel.

8. The wheelchair safety device of claim 1, wherein the brake lever connects with a handle at its end portion.

9. The wheelchair safety device of claim 1, wherein the angularly adjustable mounting plate is adapted for use with wheelchair tires of various dimensions.

* * * * *